UNITED STATES PATENT OFFICE.

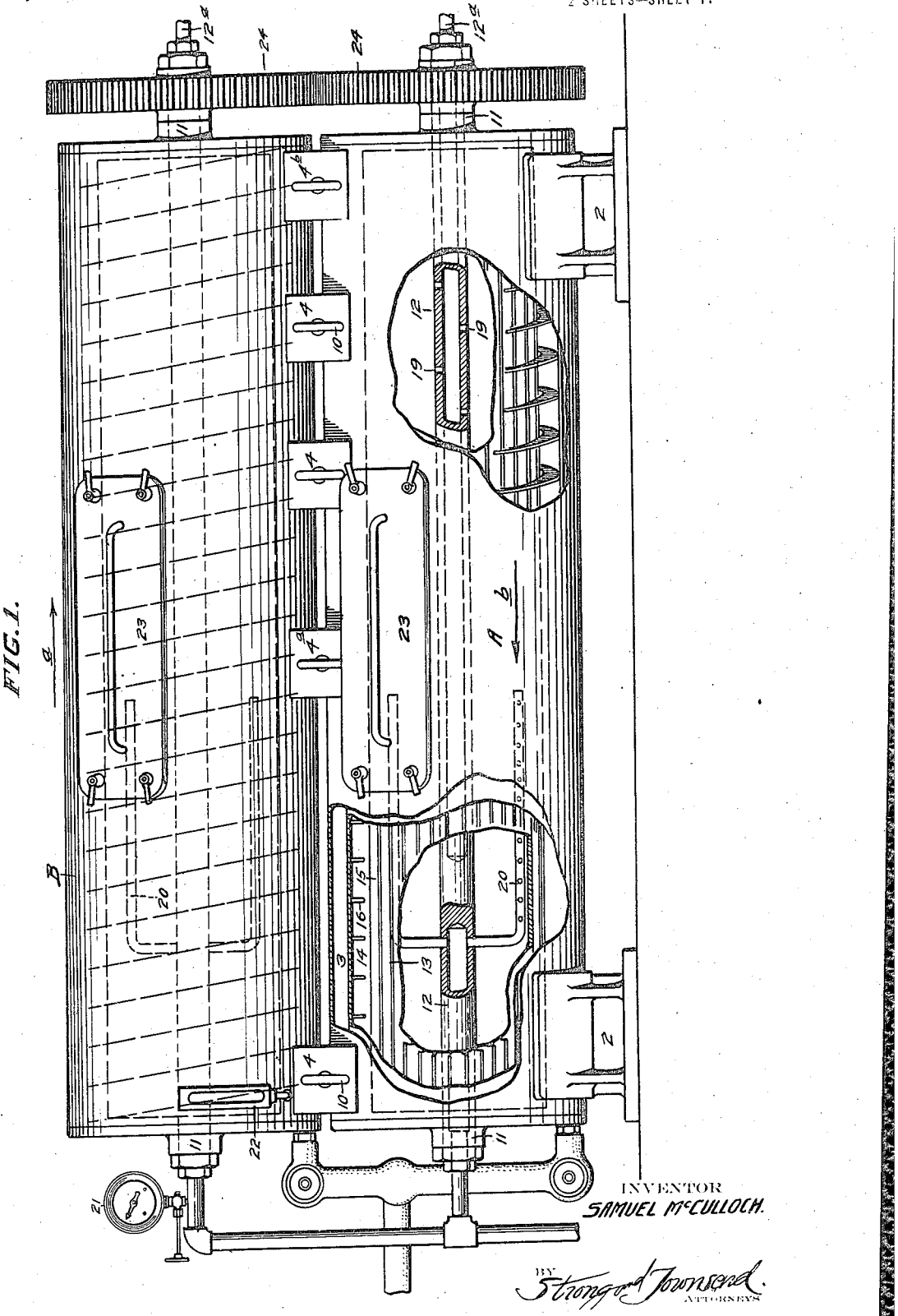

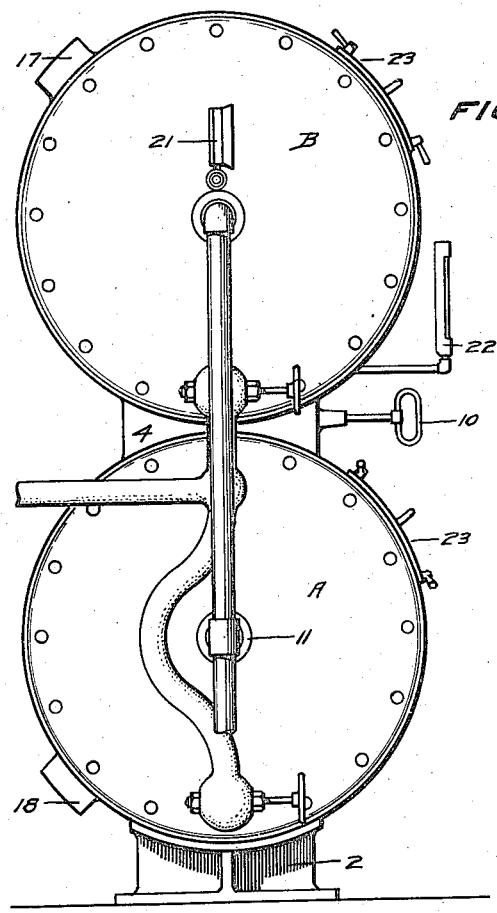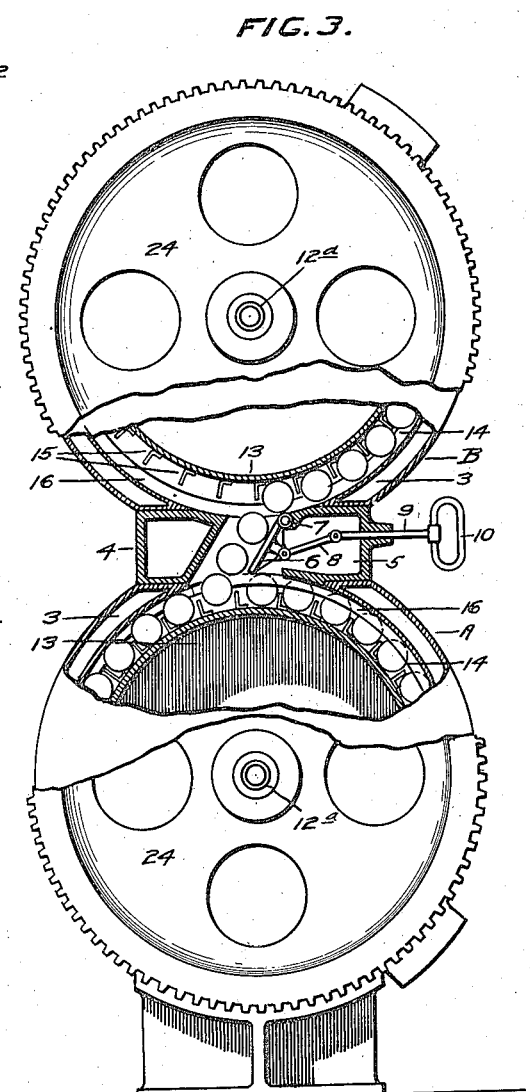

SAMUEL McCULLOCH, OF SAN FRANCISCO, CALIFORNIA, ASSIGNOR TO CHARLES A. MULLEN, OF SAN FRANCISCO, CALIFORNIA.

COOKER.

1,424,500.  Specification of Letters Patent.  Patented Aug. 1, 1922.

Application filed May 8, 1919. Serial No. 295,612.

*To all whom it may concern:*

Be it known that I, SAMUEL McCULLOCH, a subject of the King of Great Britain, residing at the city and county of San Francisco and State of California, have invented new and useful Improvements in Cookers, of which the following is a specification.

This invention relates to a cooker and particularly to that type which is employed for cooking canned goods and the like.

One of the objects of the present invention is to provide a simple and substantial cooker especially adapted for handling canned goods and the like, which consists of two superposed, elongated, cylindrical casings, each equipped with rotors and helical guideways to permit the cans to be advanced from end to end of the respective casings. Another object of the invention is to provide a series of communicating by-pass openings between the casings so that the cans may be transferred from one casing to the other a plurality of points intermediate the ends of the respective casings; and also to provide a manually operated gate positioned in each communicating by-pass opening which may be opened or closed so that the cooking period or the time required for different goods may be varied. Another object of the invention is to provide a cooker of the character described in which both the rotors and the casings employed are steam-jacketed, thus materially reducing the steam consumption and also permitting variation of the temperature in the cooking chambers. Further objects will hereinafter appear.

Having reference to the accompanying drawings:

Fig. 1 is a side elevation of the cooker, parts being broken away to show the interior mechanism.

Fig. 2 is an end view.

Fig. 3 is a view of the opposite end partly broken away.

Referring to the drawings in detail, and particularly to Figs. 1 and 2, it will be seen that the cooker consists of a pair of cylindrical shaped casings A and B, of suitable length, which are supported upon bearing frames 2. The cylindrical casing B is positioned directly above the casing A and is supported thereby, and both casings are provided with steam jackets 3 which extend from end to end of the respective casings and completely surround the same.

Interposed between the cylindrical casings A and B is a plurality of casings 4, in which are formed by-pass openings, generally indicated at 5. Mounted in each casing is a gate member 6 which is pivotally secured, as at 7, and connected with each gate member is a link 8 and a sliding lever 9. The levers 9 project through the casings 4 and each is provided with a handle member 10 to permit the gates 6 to be opened or closed, as will be hereinafter described. Formed in each end of the respective cylindrical casings A and B are bearing members 11 and extending through the respective casings and the bearing members 11 are hollow shafts 12, upon each of which is supported a rotor 13. Formed between each rotor and the casing in which it is mounted is an annular cooking chamber 14, and secured on the exterior surface of each rotor and extending from end to end thereof is a plurality of interspaced angle bars 15.

Secured on the interior surface of the respective casings A and B are helical guide members 16, and formed at one end of the casing B is a can receiving opening 17. Formed in the lower portion of the lower casing and in the same end is a discharge opening 18 and formed in the shafts 12 within the respective rotors are discharge ports 19, through which steam is admitted to the interior of the rotors. The shafts 12 are both connected with a suitable source of steam supply; the steam being admitted through the ends shown at 12ª The steam entering said hollow shafts discharges through ports 19 directly into the rotors. It then passes through said chambers and finally discharges through a series of perforated radially disposed pipes 20 to permit water, caused by condensation, to freely escape during the operation of the cooker. The steam escaping through the opposite ends of the hollow shafts 12 may be returned to the boilers or other source of supply or it may be passed on to an exhaust box or other machine in the cannery where steam is required. The steam employed in the exterior jackets is admitted in any suitable manner and circulated therethrough and may also be used for other purposes, if desired, or returned to the boiler as described.

The respective jackets employed may be provided with pressure gages, such as shown at 21, and thermometers, as shown at 22, to determine both the pressure and the temperature employed and the casings may be provided with inspection doors 23 to permit ready access to the interior of the cookers, if a can should burst or a jam should otherwise form.

In actual operation, it is obvious that the rotors 13 must be driven in unison. This is accomplished by providing a pair of intermeshing gears 24, to which power is transmitted in any suitable manner. The rotors are, therefore, continuously revolving during the operation of the cooker and they will also revolve in unison, thus permitting a perfect timing which materially decreases any chance of the cans jamming when being transferred from one cooking chamber to the other. The revolution of the rotors 13 is so timed that the cooker may take the cans as they are discharged by the closing machines and it may be directly connected with the closing machines by means of a conveyer which delivers the cans directly to the intake opening 17. They are here engaged by the angle bars 15, and they are spaced apart when traveling through the cooker as the spacing between the angle bars is a little greater than the diameter of the largest cans employed. The cans are, furthermore, engaged by the helical guide members 16 and they are, therefore gradually advanced from one end to the other of the respective cooking chambers during the rotation of the rotors.

The communicating openings 5, formed between the respective cooking chambers, permit the cans delivered to the upper casing B to be by-passed and delivered to the lower casing A at any point intermediate the ends of the respective casings. This is of great importance as some canned goods require more cooking than others. For instance, when handling certain varieties of fish and meats it often requires a cooking of eighty minutes or more, while when cooking certain fruits ten minutes is often sufficient.

By referring to Fig. 1, it will be seen that the helical guide member mounted in the upper casing B is so positioned that the cans are fed in the direction of arrow $a$ when delivered to the upper cooking chamber. Again, by referring to the same figure, it will be seen that the arrangement of the helical guide in the lower casing A is similar to that in the upper casing. Cans, when by-passed or transferred to the lower cooking chamber will, therefore, travel in a reverse direction or that indicated by the arrow $b$ due to the reverse revolution of the rotor. Cans delivered to the upper casing are, for instance, permitted to travel to the by-pass shown at $4^a$. If this is open, it will be obvious that they will be transferred to the lower cooking chamber and that their direction of travel will be reversed. They will accordingly discharge through the opening 18 and the time required will be proportional to the number of revolutions transmitted to the respective rotors. If it is desired to give a longer cooking, it is only necessary to close the by-pass shown at $4^a$ and to open the next by-pass. If a still greater cook is required, it is possible that all by-passes will be closed except that shown at $4^b$. The time period may, therefore, be varied to suit different grades or varieties of goods and uniform results may be obtained under any conditions.

By referring to Figs. 1 and 3 it will be seen that the cans, during a portion of the rotation of the rotors, are carried and supported between the angle bars 15 and that during another portion of the revolution they will be supported by the interior surface of the respective casings A and B. They, therefore, frequently engage said interior surfaces and as, practically speaking, the entire weight of the cans is exerted against the interior surface it should be obvious that the cans will roll over said surfaces, thereby turning the contents of the cans over and over. This is of considerable importance as it permits a uniform heating and thorough cooking of the contents.

Another important feature of the present invention is the steam economy obtained by providing the exterior jackets 3 and the rotors 13 which are heated inside by means of steam delivered through the hollow shafts 12. The annular cooking chambers 14 formed between the rotors and the jackets 3 are subjected to heat from each side and the cans passing through said chambers will be subjected to the temperature in the chambers and also to heat transferred by direct conduction, as the cans are always in contact either with the exterior surfaces of the rotors or the interior surfaces of the casings A and B. The cans are in this manner subjected both to radiated and conducted heat and as it is possible to increase or decrease the pressure of the steam in the respective jacket chambers, it is obvious that the temperature in the cooking chamber may be increased or decreased as conditions may demand.

Another important feature of the invention is the simplicity of construction employed. This is due to the fact that the cooking chamber is not supplied with steam but merely the casings and rotors forming the same. The use of steam-tight doors for admitting and delivering the cans is consequently not necessary nor the gearing and other mechanical devices employed for their operation. Again, by providing doors, such as shown at 23, it is obvious that a jam produced by a defective or burst can can easily be cleared as it will only be necessary to open the door and remove the cans which may have become jammed between the helical guides and the angle bars 15. In fact, isinglass ports may be employed, if desired, so that the cans passing through the cooker may be under constant observation.

The length of the cooker here shown will in most instances be one-half of that of similar types, due to the fact that two chambers are employed, one being positioned above the other. This materially reduces the length of the cooker and also the space occupied and it also permits a lighter and more rigid structure to be employed.

The heating of the cooking chambers, both from the exterior and the interior, is a great advantage as it will permit the maintenance of higher temperatures than would otherwise be possible. For instance, it is well known that the temperature is always proportional to the pressure employed and as this is exceedingly limited where steam-tight admission and discharge doors are employed, it will be obvious that much greater temperatures can here be obtained due to the fact that the steam is merely passed through jacketed chambers which may be subjected to almost any pressure desired.

While I have previously stated that steam is not delivered to the cooking chambers, I wish it understood that a sufficient amount of steam may be admitted to moisten the atmosphere and thereby promote both radiation and conduction of the heat.

Having thus described my invention, what I claim and desire to secure by Letters Patent is—

1. A cooker comprising a pair of elongated, cylindrical-shaped casings, one placed above the other, a hollow rotor journaled in each casing and centrally positioned therein to form an annular cooking chamber in each casing, a jacket member surrounding each casing, a hollow shaft extending through each casing and supporting each rotor, means for rotating the shafts and the rotors carried thereby, means for circulating steam through the hollow rotors and the jackets surrounding the casings to heat the annular cooking chambers formed between the rotors and the casings, means for delivering cans to the annular chamber formed in the upper casing, means for advancing the cans through the casing when delivered, a plurality of communicating openings formed between the upper and lower casings, manually controlled means for opening or closing said communicating openings to permit the cans to be transferred from one casing to the other at a plurality of points between the ends of the respective casings, and means for advancing the cans from end to end of the lower casing but in a direction opposite to the travel of cans in the upper casing.

2. A continuous cooker comprising an elongated, cylindrical-shaped casing, a hollow rotor journaled therein, a jacket surrounding the casing, means for passing steam through the rotor and the jacket to heat an annular cooking chamber formed between the rotor and the casing and without admitting steam to the cooking chamber, and means actuated by the rotor for advancing cans through the casing.

3. A continuous cooker comprising an elongated, cylindrical-shaped casing, a hollow rotor journaled therein, a jacket surrounding the casing, means for passing steam through the rotor and the jacket to heat an annular cooking chamber formed between the rotor and the casing and without admitting steam to the cooking chamber, a helical guide member formed on the inner surface of the casing, means for admitting cans one by one to the annular space formed between the rotor and the casing, and means on the rotor for engaging the cans and advancing the same through the helical guide member.

4. A continuous cooker comprising an elongated, cylindrical-shaped casing, a hollow rotor journaled therein, a jacket surrounding the casing, means for passing steam through the rotor and the jacket to heat an annular cooking chamber formed between the rotor and the casing and without admitting steam to the cooking chamber, a helical guide member formed on the inner surface of the casing, means for admitting cans one by one to the annular space formed between the rotor and the casing, and means on the rotor for engaging the cans and advancing the same through the helical guide member, said means comprising interspaced projecting flanges formed on the rotor.

5. A continuous cooker comprising an elongated, cylindrical-shaped casing, a hollow rotor journaled therein, a jacket surrounding the casing, means for circulating steam through the rotor and the jacket to heat an annular space formed between the rotor and the casing and without admitting steam to the cooking chamber, a helical guide member formed on the interior surface of the casing, means for admitting cans one by one to the cooking chamber formed between the rotor and the casing, projecting members on the rotor engageable with the cans to advance the same through the helical guide member, and a plurality of discharge outlets formed in the casing through which the cans may be discharged.

6. A continuous cooker comprising an elongated, cylindrically-shaped casing, a hollow rotor journaled therein, a jacket surrounding the casing, means for circulating steam through the rotor and the jacket to heat an annular space formed between the rotor and the casing and without admitting steam to the cooking chamber, a helical guide member formed on the interior surface of the casing, means for admitting cans one by one to the cooking chamber formed between the rotor and the casing, projecting members on the rotor engageable with the cans to advance the same through the helical guide member, a plurality of discharge outlets formed in the casing through which the cans may be discharged, and manually controlled means for opening or closing the discharge openings.

7. A continuous cooker comprising a pair of elongated, cylindrical-shaped casings, one placed above the other, a hollow rotor journaled in each casing and centrally positioned therein to form an annular cooking chamber in each casing, a jacket member surrounding each casing, a hollow shaft extending through each casing and supporting each rotor, means for rotating the shafts and the rotors, carried thereby, means for circulating steam through the hollow rotors and the jackets surrounding the casings to heat the annular cooking chambers formed between the rotors and the casings and without admitting steam to the cooking chamber, means for delivering cans to the annular chamber formed in the upper casing, means for advancing the cans through the casing when delivered, means for transferring the cans from the upper casing to the lower casing, means in the lower casing for advancing the cans through said lower casing but in a direction opposite to the direction of travel of the cans in the upper casing, and a discharge opening formed in the lower casing through which the cans may be ejected.

8. A continuous cooker comprising a pair of elongated, cylindrical-shaped casings, one placed above the other, a hollow rotor journaled in each casing and centrally positioned therein to form an annular cooking chamber in each casing, a jacket member surrounding each casing, a hollow shaft extending through each casing and supporting each rotor, means for rotating the shafts and the rotors carried thereby, means for circulating steam through the hollow rotors and the jackets surrounding the casings to heat the annular cooking chambers formed between the rotors and the casings and without admitting steam to the cooking chamber, means for delivering cans to the annular chamber formed in the upper casing, means for advancing the cans through the casing when delivered, means for transferring the cans from the upper casing to the lower casing at a plurality of points intermediate the ends of the respective casings, means within the lower casing for advancing the cans therethrough but in a direction opposite to the direction of travel in the upper casing, and a discharge opening in the lower casing.

9. A continuous cooker comprising a pair of elongated, cylindrical-shaped casings, one placed above the other, a hollow rotor journaled in each casing and centrally positioned therein to form an annular cooking chamber in each casing, a jacket member surrounding each casing, a hollow shaft extending through each casing and supporting each rotor, means for rotating the shafts and the rotors carried thereby, means for circulating steam through the hollow rotors and the jackets surrounding the casings to heat the annular cooking chambers formed between the rotors and the casings and without admitting steam to the cooking chamber, means for delivering cans to the annular chamber formed in the upper casing, means for advancing the cans through the casing when delivered, a plurality of communicating openings formed between the upper and lower casings, manually controlled means for opening or closing said communicating openings to permit the cans to be transferred from one casing to the other at any point between the ends of the respective casings, and means for advancing the cans from end to end of the lower casing but in a direction opposite to the travel of cans in the upper casing.

10. A continuous apparatus for cooking food in cans comprising a pair of superposed steam jacketed cylindrical casings, hollow perforated central shafts in said casing, intermeshing gears on the shafts by which said shafts are rotated in opposite directions, hollow rotors mounted upon the shafts and turnable in unison with the same, means for circulating steam through the hollow rotor shafts and rotors and through the jacketed housings, longitudinally extending spiral ribs fixed interior of the casings, longitudinally extending bars secured on the outer faces of the rotors, means for delivering cans between said bars to permit the bars to advance the cans from end to end of the casings between the spiral ribs, a plurality of inclined passages formed between the respective housings, hinged gates in each passage, and pull rods operable from the exterior of the casings to open and close said hinged gates.

11. A continuous cooker, comprising an elongated cylindrical casing, a hollow cylindrical rotor journaled therein, having a diameter so large that a narrow annular cooking chamber is formed between the casing and the rotor which is just sufficiently large to receive the cans to be cooked, inlet and outlet connections connected with the rotor for the circulation of steam to permit interior heating of the rotor and without liberating steam into the cooking chamber, and means actuated by the rotor for advancing cans through the annular cooking chamber.

12. A continuous cooker, comprising an elongated cylindrical casing, a drum journaled centrally of the casing and extending therethrough, head members on the drum forming a closure therefor, said drum and heads having a diameter so large that a narrow annular cooking chamber is formed between the drum and the casing, means for circulating steam through the heads of the drum and through the drum to heat the same and by conduction the annular cooking chamber, means for transmitting a continuous revolving movement to the drum, and means actuated by the rotation of the drum for advancing cans through the cooking chamber.

13. A continuous cooker, comprising an elongated cylindrical casing, a drum journaled centrally of the casing and extending therethrough, head members on the drum forming a closure therefor, said drum and heads having a diameter so large that a narrow annular cooking chamber is formed between the drum and the casing, means for circulating steam through the heads of the drum and through the drum to heat the same and by conduction the annular cooking chamber, means for transmitting a continuous revolving movement to the drum, a spiral trackway interior of the casing, means for delivering cans thereto, and longitudinally extending bars of the drum engageable with the cans to advance the steam along the trackway.

14. A continuous cooker, comprising an elongated cylindrical casing, a drum journaled centrally of the casing and extending therethrough, head members on the drum forming a closure therefor, said drum and heads having a diameter so large that a narrow annular cooking chamber is formed between the drum and the casing, means for circulating steam through the heads of the drum and through the drum to heat the same and by conduction the annular cooking chamber, means for transmitting a continuous revolving movement to the drum, a spiral trackway interior of the casing, means for delivering cans thereto, and longitudinally extending bars of the drum engageable with the cans to advance the same along the trackway, a plurality of discharge openings formed in the casing along the spiral trackway, and means for opening or closing any one of said openings.

15. A cooker comprising a casing having a can-way therein, a rotatable closed drum for advancing cans along the can-way, a jacket exterior of the casing and means for circulating steam through said jacket and through the drum and without admitting steam into the can-way.

16. A continuous cooker, comprising a casing having a can-way therein, a rotatable closed drum for advancing cans along the can-way, and means for introducing steam into said drum.

17. A continuous cooker comprising a casing having a can-way therein, a rotatable heater for advancing the cans along the can-way and means for introducing steam into the heater, said heater being so constructed that the steam does not contact with the cans.

18. A continuous cooker, comprising a casing, a packageway therein, closed propelling means for moving the packages along the way and means introducing steam under pressure into the closed propelling means.

19. A continuous cooker, comprising a casing having a can-way therein, and steam heated means for advancing the cans along the can-way constructed to prevent contact of the steam with the cans.

20. A cooker comprising a cylindrical shaped casing having a can-way therein, a rotatable member for advancing cans along the can-way, a jacket exterior of the casing, and means for circulating steam through the jacket to heat the can-way.

In testimony whereof I have hereunto set my hand in the presence of two subscribing witnesses.

SAMUEL McCULLOCH.

Witnesses:
  THOMAS CASTBERG,
  JOHN H. HERRING.